United States Patent
Song

(10) Patent No.: US 10,153,957 B2
(45) Date of Patent: Dec. 11, 2018

(54) FAULT DIAGNOSIS METHOD, DEVICE, AND FAULT DIAGNOSIS SYSTEM

(71) Applicant: Huawei Device (Shenzhen) Co., Ltd., Shenzhen (CN)

(72) Inventor: Chen Song, Wuhan (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 9 days.

(21) Appl. No.: 15/031,812

(22) PCT Filed: Oct. 17, 2014

(86) PCT No.: PCT/CN2014/088837
§ 371 (c)(1),
(2) Date: Apr. 25, 2016

(87) PCT Pub. No.: WO2015/058653
PCT Pub. Date: Apr. 30, 2015

(65) Prior Publication Data
US 2016/0248649 A1    Aug. 25, 2016

(30) Foreign Application Priority Data

Oct. 25, 2013  (CN) .......................... 2013 1 0512442

(51) Int. Cl.
*H04L 12/26* (2006.01)
*H04W 12/06* (2009.01)

(52) U.S. Cl.
CPC .......... *H04L 43/0847* (2013.01); *H04L 43/50* (2013.01); *H04W 12/06* (2013.01)

(58) Field of Classification Search
CPC ..... H04L 43/0847; H04L 43/50; H04W 12/06
See application file for complete search history.

(56) References Cited

U.S. PATENT DOCUMENTS

| 2005/0038526 A1* | 2/2005 | Choi .................. H04L 12/5692 |
| | | 700/1 |
| 2007/0197206 A1* | 8/2007 | Olson ..................... H04L 41/06 |
| | | 455/423 |

(Continued)

FOREIGN PATENT DOCUMENTS

| CN | 1794654 A | 6/2006 |
| CN | 102183945 A | 9/2011 |

(Continued)

OTHER PUBLICATIONS

Partial English Translation and Abstract of Chinese Patent Application No. CN102183945, Apr. 23, 2016, 6 pages.

(Continued)

*Primary Examiner* — Chi H Pham
*Assistant Examiner* — Weibin Huang
(74) *Attorney, Agent, or Firm* — Conley Rose, P.C.

(57) ABSTRACT

A fault diagnosis method includes establishing a wireless connection with a home gateway device in a local area network, if the wireless connection is successfully established, sending a diagnosis request to the home gateway device such that the home gateway device performs fault diagnosis, and receiving a fault diagnosis result returned by the home gateway device. After successfully establishing a wireless connection with a home gateway device in a local area network, a terminal sends a diagnosis request to the home gateway device to trigger the home gateway device to perform fault diagnosis.

12 Claims, 7 Drawing Sheets

(56) References Cited

U.S. PATENT DOCUMENTS

| | | | | |
|---|---|---|---|---|
| 2007/0239397 | A1* | 10/2007 | Bourne | H04L 43/50 |
| | | | | 702/183 |
| 2008/0022336 | A1* | 1/2008 | Howcroft | H04L 12/2801 |
| | | | | 725/100 |
| 2010/0256864 | A1 | 10/2010 | Ying | |
| 2011/0099597 | A1* | 4/2011 | Boatright | H04L 41/5074 |
| | | | | 725/107 |
| 2012/0140641 | A1 | 6/2012 | Reese et al. | |
| 2012/0208562 | A1 | 8/2012 | Wilkin et al. | |
| 2014/0313902 | A1* | 10/2014 | Bruner | H04W 28/0236 |
| | | | | 370/238 |
| 2014/0376385 | A1* | 12/2014 | Boss | H04L 43/0811 |
| | | | | 370/242 |

FOREIGN PATENT DOCUMENTS

| | | | |
|---|---|---|---|
| CN | 103354986 A | 10/2013 | |
| EP | 1507398 A1 | 2/2005 | |
| EP | 2464054 A1 | 6/2012 | |

OTHER PUBLICATIONS

Foreign Communication From a Counterpart Application, European Application No. 14856767.0, Extended European Search Report dated Jun. 23, 2016, 7 pages.

Foreign Communication From a Counterpart Application, PCT Application No. PCT/CN2014/088837, English Translation of International Search Report dated Jan. 15, 2015, 2 pages.

Foreign Communication From a Counterpart Application, PCT Application No. PCT/CN2014/088837, English Translation of Written Opinion dated Jan. 15, 2015, 7 pages.

* cited by examiner

FAULT DIAGNOSIS METHOD, DEVICE, AND FAULT DIAGNOSIS SYSTEM

CROSS-REFERENCE TO RELATED APPLICATIONS

This application is a U.S. National Stage of International Application No. PCT/CN2014/088837, filed on Oct. 17, 2014, which claims priority to Chinese Patent Application No. 201310512442.X, filed on Oct. 25, 2013 and entitled "FAULT DIAGNOSIS METHOD, DEVICE, AND FAULT DIAGNOSIS SYSTEM", both of which are incorporated herein by reference in their entireties.

TECHNICAL FIELD

The present disclosure relates to the field of communications, and in particular, to a fault diagnosis method, a device, and a fault diagnosis system.

BACKGROUND

With the rapid development of communications technologies, a quantity of home gateway devices becomes increasingly large. A home gateway device is a network device located inside a home. A function of the home gateway device is to enable various network devices in the home to access the Internet service, or to implement communication among these network devices. When a fault occurs in the home gateway device, the network devices in the home fail to connect to a network normally if the fault cannot be cleared in a timely manner. Therefore, when a fault occurs in the home gateway device, it is necessary to diagnose the fault in the home gateway device in a timely manner, to ensure normal operation of the network devices in the home.

In the prior art, when a fault in a home gateway device is diagnosed, generally two methods are used. A first method is, after a user finds that a fault occurs in a home gateway, the user contacts an operator, the operator controls network management system (NMS) to initiate a remote diagnostic command for the fault in the home gateway device, and after obtaining a fault diagnosis result returned by the home gateway device, feeds the fault diagnosis result back to the user. A second method is, a user contacts an operator, and the operator arranges relevant personnel to perform manual diagnosis on the fault in the home gateway device.

For the foregoing first method for diagnosing a fault in a home gateway device, when a fault occurs in a home gateway device, a user needs to contact an operator so that the operator triggers fault diagnosis, not only dependency on the operator is relatively heavy, but also the fault cannot be diagnosed in a timely manner, and efficiency of diagnosing the fault in the home gateway device is relatively low. For the foregoing second method for diagnosing a fault in a home gateway device, if an operator arranges relevant personnel to perform manual diagnosis for a home gateway device, because there are a large quantity of home gateways, it is quite difficult to meet requirements of maintenance and management of home networks, and diagnosis cannot be performed for the home gateway device in an accurate and timely manner, resulting in relatively low efficiency in diagnosing a fault in the home gateway device. In addition, a specified technician is required to provide an on-site service to perform diagnosis for the home gateway device, which not only wastes manpower resources, but also incurs relatively high costs to the user in maintaining the home gateway device.

SUMMARY

To resolve the problems in the prior art, embodiments of the present disclosure provide a fault diagnosis method, a device, and a fault diagnosis system. The technical solutions are as follows:

According to a first aspect, a fault diagnosis method is provided, where the method includes issuing a wireless connection with a home gateway device in a local area network, if the wireless connection with the home gateway device is successfully established, sending a diagnosis request to the home gateway device such that the home gateway device performs fault diagnosis according to the diagnosis request, and receiving a fault diagnosis result returned by the home gateway device.

With reference to the first aspect, in a first possible implementation manner of the first aspect, after the issuing a wireless connection with a home gateway device in a local area network, the method further includes, if the wireless connection with the home gateway device is not successfully established, issuing a remote connection with a NMS, and after the remote connection with the NMS is successfully established, sending a diagnosis request to the NMS such that the NMS forwards the diagnosis request to the home gateway device for the home gateway device to perform fault diagnosis, and receives a fault diagnosis result sent by the home gateway device, and receiving the fault diagnosis result forwarded by the NMS.

With reference to the first aspect, in a second possible implementation manner of the first aspect, after the receiving a fault diagnosis result returned by the home gateway device, the method further includes issuing a remote connection with a network management system NMS, and after the remote connection with the NMS is successfully established, forwarding the fault diagnosis result to the NMS.

With reference to any possible implementation manner of the first aspect to the second possible implementation manner of the first aspect, in a third possible implementation manner of the first aspect, the fault diagnosis result includes network configuration information, and the method further includes receiving verification configuration information that is returned by the network management system NMS after the NMS performs verification on the network configuration information, and forwarding the verification configuration information to the home gateway device, and receiving a network test result that is returned by the home gateway device after the home gateway device performs a network test according to the verification configuration information.

According to a second aspect, a fault diagnosis method is provided, where the method includes issuing a wireless connection with a terminal in a local area network, and after the wireless connection with the terminal is successfully established, receiving a diagnosis request sent by the terminal, performing fault diagnosis according to the diagnosis request sent by the terminal, and returning a fault diagnosis result to the terminal.

With reference to the second aspect, in a first possible implementation manner of the second aspect, after the issuing a wireless connection with a terminal in a local area network, the method further includes, when the wireless connection with the terminal is not successfully established, receiving a diagnosis request forwarded by a NMS, where the diagnosis request is sent to the NMS by the terminal, and performing fault diagnosis according to the diagnosis request forwarded by the NMS, and sending a fault diagnosis result to the NMS, where the NMS forwards the fault diagnosis result to the terminal.

With reference to the second aspect or the first possible implementation manner of the second aspect, in a second possible implementation manner of the second aspect, the fault diagnosis result includes network configuration information, and the method further includes receiving verification configuration information forwarded by the terminal, and after performing a network test according to the verification configuration information, returning a network test result to the terminal, where the verification configuration information is returned to the terminal by the NMS after the NMS performs verification on the network configuration information.

With reference to the second aspect or the first possible implementation manner of the second aspect, in a third possible implementation manner of the second aspect, after the receiving a diagnosis request, the method further includes performing authentication on the device that sends the diagnosis request, and after the authentication succeeds, performing the step of performing fault diagnosis according to the diagnosis request.

According to a third aspect, a terminal is provided, where the terminal includes a first connection module configured to issue a wireless connection with a home gateway device in a local area network, a first sending module configured to, when the wireless connection with the home gateway device is successfully established, send a diagnosis request to the home gateway device such that the home gateway device performs fault diagnosis according to the diagnosis request, and a first receiving module configured to receive a fault diagnosis result returned by the home gateway device.

With reference to the third aspect, in a first possible implementation manner of the third aspect, the terminal further includes a second connection module configured to, when the wireless connection with the home gateway device is not successfully established, issue a remote connection with a NMS, a second sending module configured to, after the remote connection with the NMS is successfully established, send a diagnosis request to the NMS such that the NMS forwards the diagnosis request to the home gateway device for the home gateway device to perform fault diagnosis, and receives a fault diagnosis result sent by the home gateway device, and a second receiving module configured to receive the fault diagnosis result forwarded by the NMS.

With reference to the third aspect, in a second possible implementation manner of the third aspect, the terminal further includes a third connection module configured to issue a remote connection with a NMS, and a first forwarding module configured to, after the remote connection with the NMS is successfully established, forward the fault diagnosis result to the NMS.

With reference to any possible implementation manner of the third aspect to the second possible implementation manner of the third aspect, in a third possible implementation manner of the third aspect, the fault diagnosis result includes network configuration information, and the terminal further includes a third receiving module configured to receive verification configuration information that is returned by the NMS after the NMS performs verification on the network configuration information, a second forwarding module configured to forward the verification configuration information to the home gateway device, and a fourth receiving module configured to receive a network test result that is returned by the home gateway device after the home gateway device performs a network test according to the verification configuration information.

According to a fourth aspect, a home gateway device is provided, where the device includes a first connection module configured to issue a wireless connection with a terminal in a local area network, a first receiving module configured to, after the wireless connection with the terminal is successfully established, receive a diagnosis request sent by the terminal, a diagnosis module configured to perform fault diagnosis according to the diagnosis request sent by the terminal, and a first returning module configured to return a fault diagnosis result to the terminal.

With reference to the fourth aspect, in a first possible implementation manner of the fourth aspect, the device further includes a second receiving module configured to, when the wireless connection with the terminal is not successfully established, receive a diagnosis request forwarded by a NMS, where the diagnosis request is sent to the NMS by the terminal, and the diagnosis module is further configured to perform fault diagnosis according to the diagnosis request forwarded by the NMS, and a first sending module configured to send a fault diagnosis result to the NMS, where the NMS forwards the fault diagnosis result to the terminal.

With reference to the fourth aspect or the first possible implementation manner of the fourth aspect, in a second possible implementation manner of the fourth aspect, the fault diagnosis result includes network configuration information, and the device further includes a third receiving module configured to receive the verification configuration information forwarded by the terminal, and a second returning module configured to, after performing a network test according to the verification configuration information, return a network test result to the terminal, where the verification configuration information is returned to the terminal by the NMS after the NMS performs verification on the network configuration information.

With reference to the fourth aspect or the first possible implementation manner of the fourth aspect, in a third possible implementation manner of the fourth aspect, the device further includes an authentication module configured to perform authentication on the device that sends the diagnosis request, where the diagnosis module is further configured to, after the authentication succeeds, perform the step of performing fault diagnosis according to the diagnosis request.

According to a fifth aspect, a fault diagnosis system is provided, where the system includes a terminal and a home gateway device, where the terminal is as the terminal according to the foregoing third aspect, and the home gateway device is as the device according to the foregoing fourth aspect.

According to the technical solutions provided by the embodiments of the present disclosure, after successfully establishing a wireless connection with a home gateway device in a local area network, a terminal sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

Embodiment 1

Figure 1:
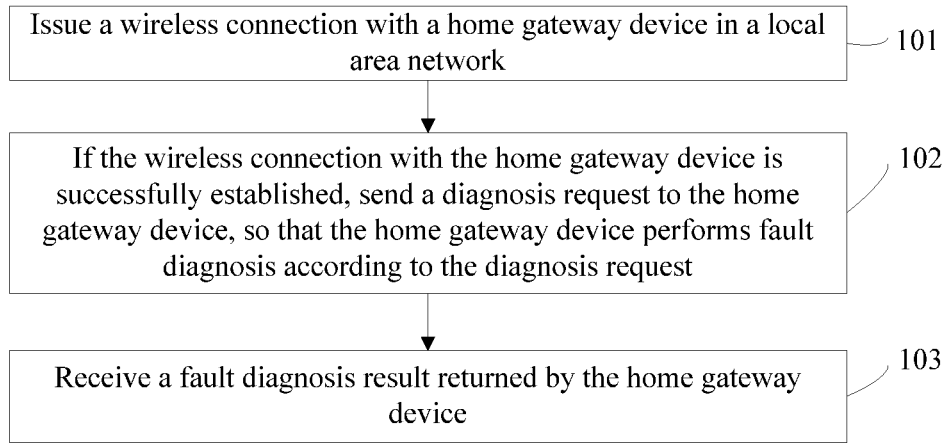
FIG. 1 is a flowchart of a fault diagnosis method according to Embodiment 1 of the present disclosure.

This embodiment of the present disclosure provides a fault diagnosis method. The method can be triggered in a local area network using a terminal to diagnose a fault in a home gateway device located in the local area network. A perspective in which a terminal executes the method provided by this embodiment of the present disclosure is taken as an example. Referring to FIG. 1, a flowchart of the method provided by this embodiment of the present disclosure includes the following steps.

Step 101: Issue a wireless connection with a home gateway device in a local area network.

Step 102: If the wireless connection with the home gateway device is successfully established, send a diagnosis request to the home gateway device such that the home gateway device performs fault diagnosis according to the diagnosis request.

Step 103: Receive a fault diagnosis result returned by the home gateway device.

Preferably, after the issuing a wireless connection with a home gateway device in a local area network, the method further includes, if the wireless connection with the home gateway device is not successfully established, establishing a remote connection with an NMS, and after the remote connection with the NMS is successfully established, sending a diagnosis request to the NMS such that the NMS forwards the diagnosis request to the home gateway device for the home gateway device to perform fault diagnosis, and receives a fault diagnosis result sent by the home gateway device, and receiving the fault diagnosis result forwarded by the NMS.

Preferably, after the receiving a fault diagnosis result returned by the home gateway device, the method further includes establishing a remote connection with an NMS, and after the remote connection with the NMS is successfully established, forwarding the fault diagnosis result to the NMS.

Preferably, the fault diagnosis result includes network configuration information, and the method further includes receiving verification configuration information that is returned by the NMS after the NMS performs verification on the network configuration information, and forwarding the verification configuration information to the home gateway device, and receiving a network test result that is returned by the home gateway device after the home gateway device performs a network test according to the verification configuration information.

Figure 2:
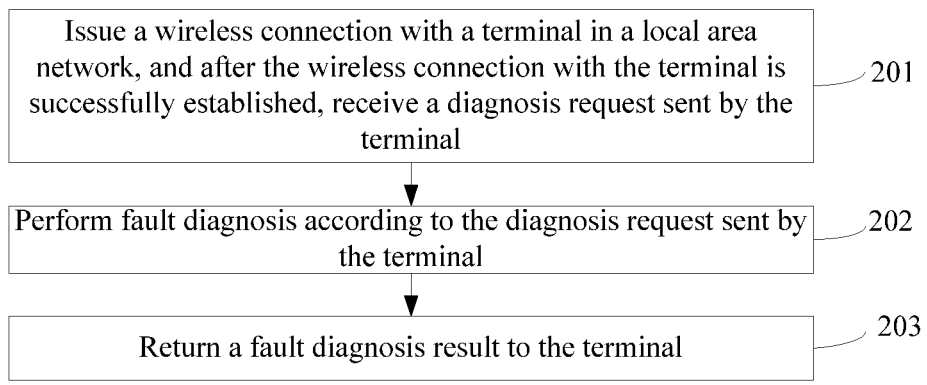
FIG. 2 is a flowchart of another fault diagnosis method according to Embodiment 1 of the present disclosure.

A perspective in which a home gateway device executes the method provided by this embodiment of the present disclosure is taken as an example. Referring to FIG. 2, a flowchart of the method provided by this embodiment of the present disclosure includes the following steps.

Step 201: Issue a wireless connection with a terminal in a local area network, and after the wireless connection with the terminal is successfully established, receive a diagnosis request sent by the terminal.

Step 202: Perform fault diagnosis according to the diagnosis request sent by the terminal.

Step 203: Return a fault diagnosis result to the terminal.

Preferably, after the issuing a wireless connection with a terminal in a local area network, the method further includes, when the wireless connection with the terminal is not successfully established, receiving a diagnosis request forwarded by a network management system NMS, where the diagnosis request is sent to the NMS by the terminal, and performing fault diagnosis according to the diagnosis request forwarded by the NMS, and sending a fault diagnosis result to the NMS, where the NMS forwards the fault diagnosis result to the terminal.

Preferably, the fault diagnosis result includes network configuration information, and the method further includes receiving verification configuration information forwarded by the terminal, and after performing a network test according to the verification configuration information, returning a network test result to the terminal, where the verification configuration information is returned to the terminal by the network management system NMS after the NMS performs verification on the network configuration information.

Preferably, after the receiving a diagnosis request, the method further includes performing authentication on the device that sends the diagnosis request, and after the authentication succeeds, performing the step of performing fault diagnosis according to the diagnosis request.

According to the method provided by this embodiment of the present disclosure, after successfully establishing a wireless connection with a home gateway device in a local area network, a terminal sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, the diagnosis result is forwarded to the NMS, ensuring that an operator of the home gateway device can perform collection and analysis on the fault of the home gateway device, and therefore can optimize and improve the home gateway device subsequently.

Further, when the terminal fails to establish the wireless connection with the home gateway device in the local area network, the terminal can send a diagnosis request to the NMS, after the NMS forwards the diagnosis request to the home gateway device, the home gateway device is triggered to diagnose the fault, and after obtaining a fault diagnosis result, returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 2

Figure 3:
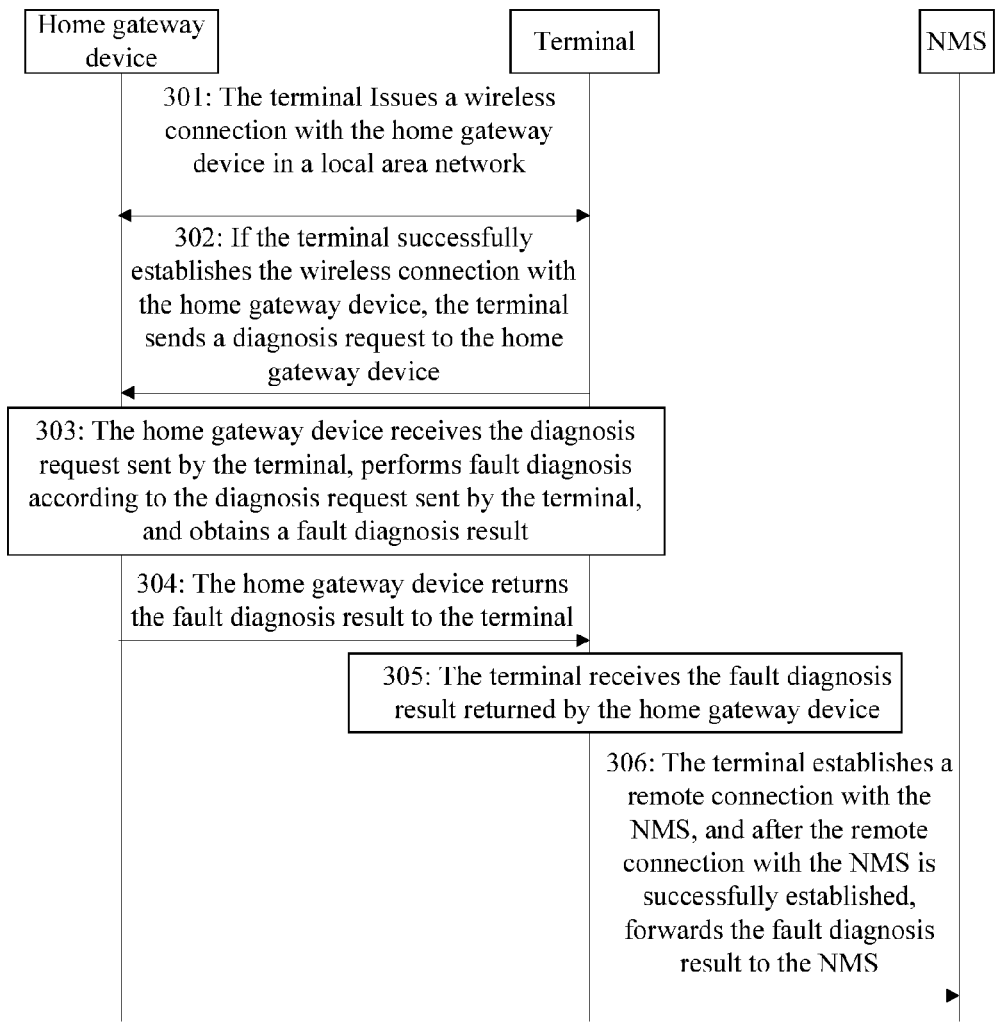
FIG. 3 is a flowchart of a fault diagnosis method according to Embodiment 2 of the present disclosure.

With reference to the content of the foregoing Embodiment 1, this embodiment of the present disclosure provides a fault diagnosis method. Referring to FIG. 3, a flowchart of the method provided by this embodiment of the present disclosure includes the following steps.

Step 301: A terminal issues a wireless connection with a home gateway device in a local area network.

For this step, when a fault occurs in the home gateway device, the method provided by this embodiment of the present disclosure allows the terminal located in the same local area network as the home gateway device to trigger the home gateway device to perform fault diagnosis. In order to trigger the home gateway device to perform fault diagnosis, the terminal needs to issue a wireless connection with the home gateway device in the local area network, and after the connection is successfully established, triggers a subsequent fault diagnosis process. For a manner in which the terminal establishes the wireless connection with the home gateway device in the local area network, this embodiment of the present disclosure sets no specific limitation thereto. In specific implementation, the manner includes, but is not limited to, that the terminal establishes the wireless connection with the home gateway device using wireless fidelity (WIFI).

When the terminal establishes the wireless connection with the home gateway device using WIFI, the terminal may first send a connection request to the home gateway device, where the connection request carries a user name and a password that are used for the terminal to establish the wireless connection with the home gateway device. After receiving the connection request, the home gateway device parses the connection request. After obtaining the user name and the password carried in the connection request, the home gateway device compares the user and the password that are obtained by parsing with a user name and a password that are already configured in a storage structure of the home gateway device. If both the user name and the password that are obtained by parsing are consistent with the user name and the password that are already configured in the storage structure of the home gateway device, the home gateway device determines that a WIFI connection with the terminal can be established, and implements communication with the terminal by sending a WIFI signal to the terminal. If either of the user name and the password that are obtained by parsing is inconsistent with the user name or the password that is already configured in the storage structure of the home gateway device, the home gateway device determines that a WIFI connection with the terminal cannot be established. Certainly, the terminal may also establish a WIFI connection with the home gateway device in another manner, and this embodiment of the present disclosure sets no specific limitation thereto.

It should be noted that, in FIG. 3 and subsequent figures, when the terminal issues a wireless connection with the home gateway device in the local area network, if there is a solid line between the terminal and the home gateway device, it indicates that the terminal can successfully establish a wireless connection with the home gateway device, and if there is a dashed line between the terminal and the home gateway device, it indicates that the terminal cannot successfully establish a wireless connection with the home gateway device.

Step 302: If the terminal successfully establishes the wireless connection with the home gateway device, the terminal sends a diagnosis request to the home gateway device.

For this step, after successfully establishing the wireless connection with the home gateway device, the terminal triggers, by sending the diagnosis request to the home gateway device, the home gateway device to perform fault diagnosis. There may be a number of manners in which the terminal sends the diagnosis request to the home gateway device, and this embodiment of the present disclosure sets no specific limitation thereto.

An application (App) may be installed on the terminal, where the App is specially used to obtain a fault condition of the home gateway device. When the terminal obtains the fault condition of the home gateway device using the App, a manner in which the terminal sends the diagnosis request to the home gateway device includes, but is not limited to, after the App is started, a service option list is popped up, where the list includes an option of "trigger diagnosis", and the terminal sends the diagnosis request to the home gateway device in a manner of detecting that the option of "trigger diagnosis" is selected.

Step 303: The home gateway device receives the diagnosis request sent by the terminal, performs fault diagnosis according to the diagnosis request sent by the terminal, and obtains a fault diagnosis result.

For this step, after receiving the diagnosis request sent by the terminal, the home gateway device performs fault diagnosis according to the diagnosis request, and obtains the fault diagnosis result. This embodiment of the present disclosure sets no limitation to a manner in which the home gateway device receives the diagnosis request sent by the terminal. In addition, for manners in which the home gateway device performs fault diagnosis according to the diagnosis request sent by the terminal and obtains the fault diagnosis result, this embodiment of the present disclosure also sets no specific limitation thereto. For example, after receiving the diagnosis request, the home gateway device performs fault diagnosis by detecting all hardware components or software configuration parameters inside the home gateway device, and obtains a faulty component or a fault diagnosis result of parameter.

Preferably, after the home gateway device receives the diagnosis request, the method further includes performing authentication on the terminal that sends the diagnosis request. After the authentication succeeds, the step of performing fault diagnosis according to the diagnosis request is then performed. There may be a number of manners in which the home gateway device performs authentication on the terminal that sends the diagnosis request. For example, the home gateway device may send a verification code to the terminal to perform authentication on the terminal, the home gateway device may also require the terminal to provide an identity identification identifier of the terminal, and the home gateway device performs authentication on the terminal according to the identity identification identifier. Certainly, the home gateway device may also perform, using another manner, authentication on the terminal that sends the diagnosis request, and this embodiment of the present disclosure sets no specific limitation thereto.

Step 304: The home gateway device returns the fault diagnosis result to the terminal.

For this step, in order for a user corresponding to the terminal to learn the fault diagnosis result of the home gateway device, after the home gateway device performs fault diagnosis according to the diagnosis request sent by the terminal and obtains the fault diagnosis result, the home gateway device returns the fault diagnosis result to the terminal such that the user corresponding to the terminal can learn the fault condition of the home gateway device using the fault diagnosis result. For a manner in which the home gateway device returns the fault diagnosis result to the terminal, this embodiment of the present disclosure sets no specific limitation thereto.

Step 305: The terminal receives the fault diagnosis result returned by the home gateway device.

For this step, after the home gateway device returns the fault diagnosis result to the terminal, the terminal receives the fault diagnosis result returned by the home gateway device in order to determine the fault condition of the home gateway device. For a manner in which the terminal receives the fault diagnosis result returned by the home gateway device, this embodiment of the present disclosure sets no specific limitation thereto.

Preferably, in order for the user corresponding to the terminal to obtain the fault diagnosis result of the home gateway device, after the terminal receives the fault diagnosis result returned by the home gateway device, the method further includes displaying the fault diagnosis result. For a manner in which the terminal displays the fault diagnosis result, this embodiment of the present disclosure sets no specific limitation thereto.

Step 306: The terminal establishes a remote connection with an NMS, and after the remote connection with the NMS is successfully established, forwards the fault diagnosis result to the NMS.

This step is a preferable step. In maintenance and management of the home gateway device, fault collection and analysis operations performed on the home gateway device by an operator of the home gateway device are quite important to the operator in optimizing and improving the home gateway device subsequently. Therefore, in order for the operator to obtain the fault condition of the home gateway device, after receiving the fault diagnosis result returned by the home gateway device, the terminal may establish the remote connection with the NMS, and after the remote connection with the NMS is successfully established, forward the fault diagnosis result to the NMS. In this case, the operator can learn the fault condition of the home gateway device using the NMS. A manner in which the terminal establishes the remote connection with the NMS includes, but is not limited to, establishing the remote connection using a 3rd-generation (3G) mobile communications technology network or 4th generation (4G) mobile communications technology network. For a manner in which the terminal forwards the fault diagnosis result to the NMS after successfully establishing the remote connection with the NMS, this embodiment of the present disclosure sets no specific limitation thereto.

According to the method provided by this embodiment of the present disclosure, after successfully establishing a wireless connection with a home gateway device in a local area network, a terminal sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, the diagnosis result is forwarded to the NMS subsequently, ensuring that an operator of the home gateway device can perform collection and analysis on the fault of the home gateway device, and therefore can implement optimization and improvement of the home gateway device subsequently.

Embodiment 3

Figure 4:
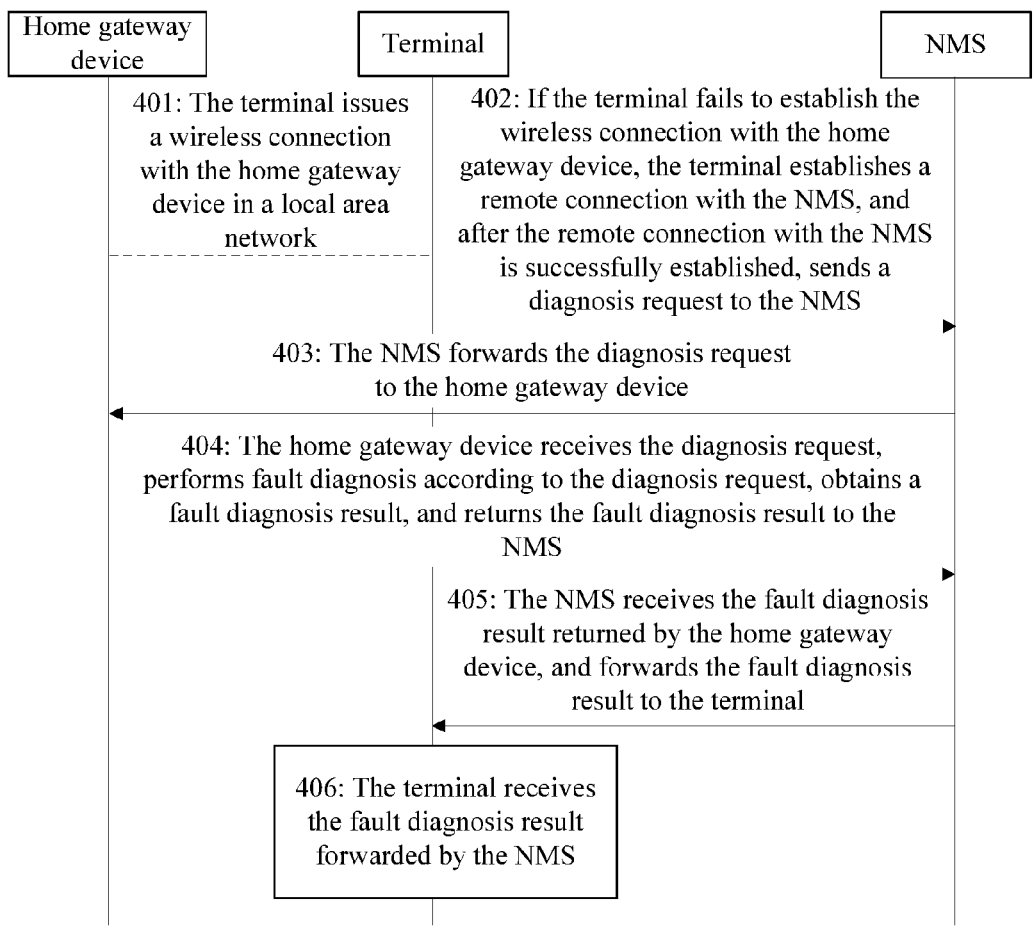
FIG. 4 is a flowchart of a fault diagnosis method according to Embodiment 3 of the present disclosure.

With reference to the content of the foregoing Embodiment 1, this embodiment of the present disclosure provides a fault diagnosis method. Referring to FIG. 4, a workflow of the method provided by this embodiment of the present disclosure includes the following steps.

Step 401: A terminal issues a wireless connection with a home gateway device in a local area network.

A principle of this step is the same as a principle of step 301 in Embodiment 2. For specifics, refer to specific content of step 301 in the foregoing Embodiment 2, and details are not described herein again.

Step 402: If the terminal fails to establish the wireless connection with the home gateway device, the terminal establishes a remote connection with an NMS, and after the remote connection with the NMS is successfully established, sends a diagnosis request to the NMS.

For this step, when a fault occurs in the home gateway device, the home gateway device may be unable to establish a wireless connection with the terminal. In this case, if the terminal fails to establish the wireless connection with the home gateway device, the terminal may learn a fault condition of the home gateway device by means of the NMS of an operator. During specific operations, the terminal may establish the remote connection with the NMS, and after the remote connection with the NMS is successfully established, send a diagnosis request to the NMS to trigger the NMS to interact with the home gateway device to obtain the fault condition. For a manner in which the terminal establishes the remote connection with the NMS, reference may be made to a manner in which the terminal establishes the remote connection with the NMS in step 306 in Embodiment 2, and details are not described herein again.

For a manner in which the terminal sends the fault diagnosis to the NMS, this embodiment of the present disclosure also sets no specific limitation thereto. For example, the terminal may be switched to a 3G/4G networking mode, an App installed on the terminal is started, and remote connection with the NMS is selected in the App, and when the remote connection with the NMS is selected, sending the diagnosis request to the NMS is triggered.

In addition, when the terminal sends the diagnosis request to the NMS, an identifier of the home gateway device may be carried in the diagnosis request such that the NMS can determine to which home gateway device the diagnosis request is to be initiated.

Step 403: The NMS forwards the diagnosis request to the home gateway device.

For this step, in order to trigger the home gateway device to diagnose the fault, the NMS needs to forward the diagnosis request to the home gateway device. For a manner in which the NMS forwards the diagnosis request to the home gateway device, this embodiment of the present disclosure sets no specific limitation thereto, and a principle thereof is the same as that of a manner in which the terminal sends the diagnosis request to the home gateway device in step 302 in Embodiment 2. For specifics, reference may be made to the content of step 302 in Embodiment 2, and details are not described herein again.

Step 404: The home gateway device receives the diagnosis request, performs fault diagnosis according to the diagnosis request, obtains a fault diagnosis result, and returns the fault diagnosis result to the NMS.

For this step, a principle by which the home gateway device receives the diagnosis request, performs fault diagnosis according to the diagnosis request, and obtains the fault diagnosis result is the same as a principle by which the home gateway device receives the diagnosis request sent by the terminal, performs fault diagnosis according to the diagnosis request sent by the terminal, and obtains the fault diagnosis result by in step 303 in Embodiment 2. For specifics, reference may be made to the content of step 303 in Embodiment 2, and details are not described herein again. A principle by which the home gateway device returns the fault diagnosis result to the NMS is the same as a principle by which the home gateway device returns the fault diagnosis result to the terminal in step 304 in Embodiment 2. For specifics, reference may be made to the content of step 304 in Embodiment 2, and details are also not described herein again.

Preferably, different operators manage different home gateway devices, and therefore after the home gateway device receives the diagnosis request forwarded by the NMS, the method further includes performing authentication on the NMS that forwards the diagnosis request. After the authentication succeeds, the step of performing fault diagnosis according to the diagnosis request is then performed. There may be a number of manners in which the home gateway device performs authentication on the NMS that forwards the diagnosis request. For example, the home gateway device may send a verification code to the NMS that forwards the diagnosis request to perform authentication on the NMS, the home gateway device may also require the NMS to provide an identity identification identifier of the NMS, and the home gateway device performs authentication on the NMS according to the identity identification identifier. Certainly, the home gateway device may also use another manner to perform authentication on the NMS that forwards the diagnosis request, and this embodiment of the present disclosure sets no specific limitation thereto.

Step 405: The NMS receives the fault diagnosis result returned by the home gateway device, and forwards the fault diagnosis result to the terminal.

For this step, in order for the terminal that requests the diagnosis to obtain the diagnosis result, the NMS forwards the fault diagnosis result to the terminal. For a manner in which the NMS receives the fault diagnosis result returned by the home gateway device and forwards the fault diagnosis result to the terminal, this embodiment of the present disclosure sets no specific limitation thereto.

Step 406: The terminal receives the fault diagnosis result forwarded by the NMS.

A principle of this step is the same as a principle by which the terminal receives the fault diagnosis result returned by the home gateway device in step 305 in Embodiment 2. For specifics, refer to specific content of step 305 in the foregoing Embodiment 2, and details are not described herein again.

Preferably, in order for a user corresponding to the terminal to obtain the fault diagnosis result of the home gateway device, after the terminal receives the fault diagnosis result returned by the home gateway device, the method further includes displaying the fault diagnosis result. For a manner in which the terminal displays the fault diagnosis result, this embodiment of the present disclosure sets no specific limitation thereto.

According to the method provided by this embodiment of the present disclosure, when a terminal fails to establish a wireless connection with a home gateway device in a local area network, the terminal can send a diagnosis request to an NMS, after the NMS forwards the diagnosis request to the home gateway device, the home gateway device is triggered to diagnose the fault, and after obtaining a fault diagnosis result, returns the fault diagnosis result to the NMS, and the NMS returns the fault diagnosis result to the terminal. In this way, even if the terminal cannot establish a wireless connection with the home gateway device, a user of the terminal can still obtain a fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 4

Figure 5:
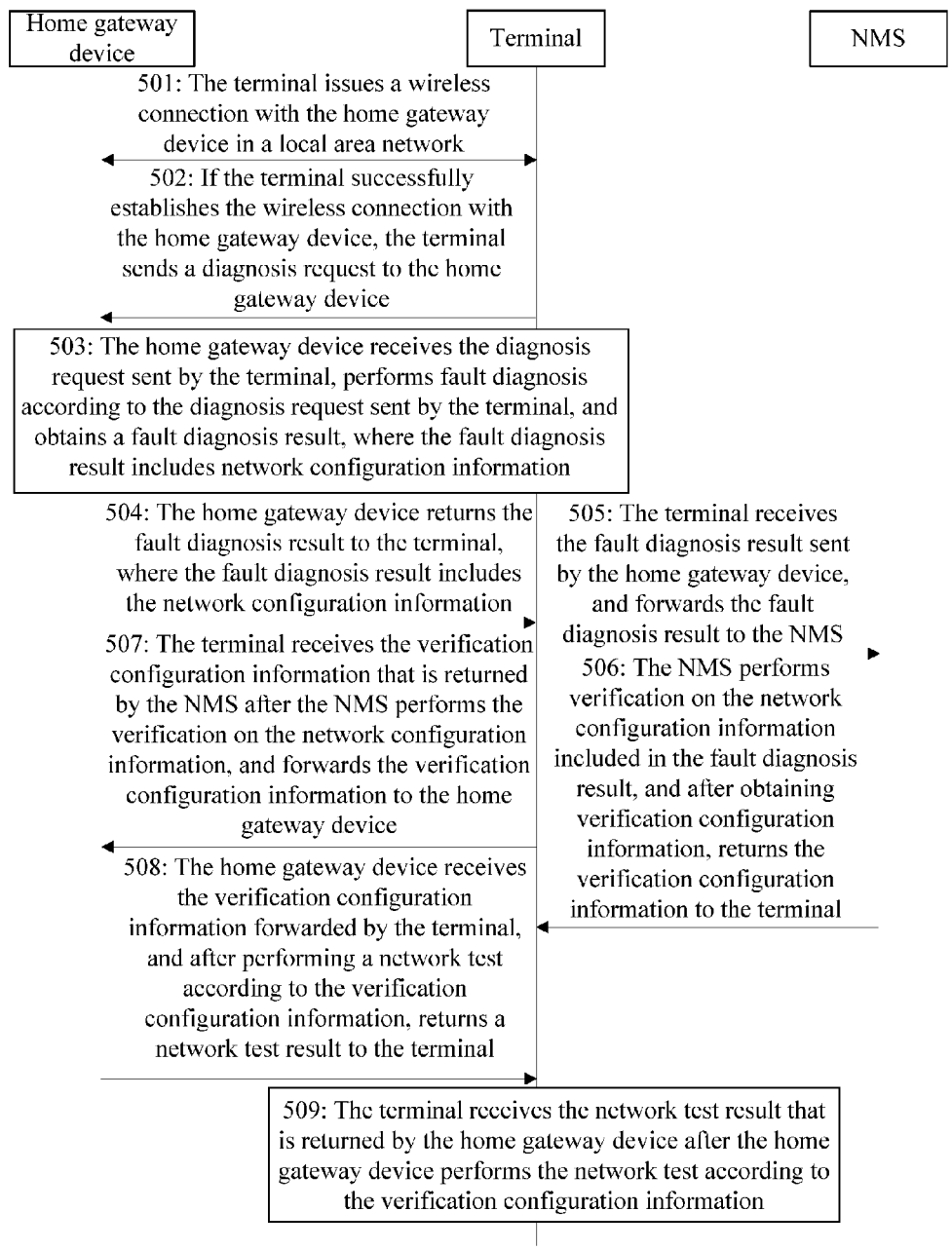
FIG. 5 is a flowchart of a fault diagnosis method according to Embodiment 4 of the present disclosure.

With reference to the content of the foregoing Embodiment 1, this embodiment of the present disclosure provides a fault diagnosis method. Referring to FIG. 5, a workflow of the method provided by this embodiment of the present disclosure includes the following steps.

Step 501: A terminal issues a wireless connection with a home gateway device in a local area network.

A principle of this step is the same as a principle of step 301 in Embodiment 2. For specifics, refer to specific content of step 301 in the foregoing Embodiment 2, and details are not described herein again.

Step 502: If the terminal successfully establishes the wireless connection with the home gateway device, the terminal sends a diagnosis request to the home gateway device.

A principle of this step is the same as a principle of step 302 in Embodiment 2. For specifics, refer to specific content of step 302 in the foregoing Embodiment 2, and details are not described herein again.

Step 503: The home gateway device receives the diagnosis request sent by the terminal, performs fault diagnosis according to the diagnosis request sent by the terminal, and obtains a fault diagnosis result, where the fault diagnosis result includes network configuration information.

For this step, a principle by which the home gateway device receives the diagnosis request sent by the terminal, performs fault diagnosis according to the diagnosis request sent by the terminal, and obtains the fault diagnosis result is the same as a principle in step 303 in Embodiment 2. For specifics, refer to specific content of step 303 in the foregoing Embodiment 2, and details are not described herein again. In addition, when learning, during the fault diagnosis, that a current network cannot be connected to the Internet normally, the home gateway device includes the network configuration information in the fault diagnosis result, where the network configuration information is Internet access information configured on the current home gateway device. This embodiment of the present disclosure sets no specific limitation to specific content of the network configuration information. For example, the network configuration information includes, but is not limited to, an account and a password for a user to access the Internet. In addition, the network configuration information may also include permanent virtual circuit (PVC) information of a router, and the like, and this embodiment of the present disclosure also sets no limitation to specific content of the PVC information of a router.

Step 504: The home gateway device returns the fault diagnosis result to the terminal, where the fault diagnosis result includes the network configuration information.

For this step, a principle by which the home gateway device returns the fault diagnosis result to the terminal is the same as a principle by which the home gateway device returns the fault diagnosis result to the terminal in step 304 in Embodiment 2. For specifics, refer to specific content of step 304 in the foregoing Embodiment 2, and details are not described herein again.

It should be noted that, when detecting that the current network cannot be connected to the Internet normally, the home gateway device includes the network configuration information in the fault diagnosis result when returning the fault diagnosis result to the terminal. For content of specific network configuration information returned to the terminal by the home gateway device, this embodiment of the present disclosure also sets no specific limitation thereto. For example, the content also includes, but is not limited to, the account and the password for accessing the Internet, the PVC information for a router, and the like.

Step 505: The terminal receives the fault diagnosis result sent by the home gateway device, and forwards the fault diagnosis result to an NMS.

For this step, if the fault diagnosis result returned by the home gateway device to the terminal includes the network configuration information, the terminal receives the fault diagnosis result sent by the home gateway device and the network configuration information included in the fault diagnosis result. For a manner in which the terminal receives the fault diagnosis result sent by the home gateway device, this embodiment of the present disclosure sets no specific limitation thereto. In addition, when the user accesses the Internet using the terminal, the terminal is used to negotiate, with an operator, key parameter information for accessing the Internet, therefore, after receiving the fault diagnosis result sent by the home gateway device, in order to determine whether key network configuration information configured on the home gateway device is correct, the terminal forwards the fault diagnosis result to the NMS such that the NMS verifies correctness of the network configuration information included in the fault diagnosis result. For a manner in which the terminal forwards the fault diagnosis result to the NMS, this embodiment of the present disclosure sets no specific limitation thereto.

Step 506: The NMS performs verification on the network configuration information included in the fault diagnosis result, and after obtaining verification configuration information, returns the verification configuration information to the terminal.

For this step, after the terminal forwards the network configuration information to the NMS, the NMS performs verification on the network configuration information and obtains the verification configuration information. In addition, in order to enable the user corresponding to the terminal to access the Internet normally, the NMS returns the verification configuration information to the terminal. There may be a number of manners in which the NMS performs verification on the network configuration information and obtains the verification configuration information. For example, the NMS may compare the received network configuration information with network configuration information that is pre-stored in the NMS, and if inconsistent network configuration information is found, the NMS corrects the network configuration information, and uses corrected network configuration information as the verification configuration information. Certainly, the NMS may also use another manner to perform verification on the network configuration information and obtain the verification configuration information, and this embodiment of the present disclosure sets no specific limitation thereto. For a manner in which the NMS returns the verification configuration information to the terminal, this embodiment of the present disclosure also sets no specific limitation thereto.

Step 507: The terminal receives the verification configuration information that is returned by the NMS after the NMS performs verification on the network configuration information, and forwards the verification configuration information to the home gateway device.

For this step, in order that verification configuration information that is consistent the network configuration information on the NMS side can be configured on the home gateway device, after the terminal receives the verification configuration information returned by the NMS, the terminal forwards the verification configuration information to the home gateway device. For manners in which the terminal receives the verification configuration information returned by the NMS and the terminal forwards the verification configuration information to the home gateway device, this embodiment of the present disclosure sets no specific limitation thereto.

Step 508: The home gateway device receives the verification configuration information forwarded by the terminal, and after performing a network test according to the verification configuration information, returns a network test result to the terminal.

For this step, after the terminal forwards the verification configuration information to the home gateway device, the home gateway device receives the verification configuration information forwarded by the terminal, and performs the network test according to the verification configuration information in order to determine, according to the verification configuration information, whether the Internet can be accessed normally. After obtaining the network test result, the home gateway device returns the network testing result to the terminal such that the user corresponding to the terminal can determine whether the Internet can be accessed normally.

A process in which the home gateway device performs the network test according to the verification configuration information includes, but is not limited to, after receiving the verification configuration information, re-configuring internal network configuration information according to the verification configuration information. Furthermore, after re-configuring the network configuration information, the home gateway device tests a current network condition, and if the network is normal, it is indicated that the verification configuration information from the NMS is correct, and the home gateway device returns a test result indicating that the network is normal to the terminal, if it is learned, by means of testing, that the Internet still cannot be accessed normally currently, the home gateway device returns a test result indicating that the network is abnormal to the terminal.

For a manner in which the home gateway device receives the verification configuration information forwarded by the terminal, a manner in which the home gateway device performs the network test according to the verification configuration information, and a manner in which the home gateway device returns the network test result to the terminal, this embodiment of the present disclosure sets no specific limitation thereto.

Step 509: The terminal receives the network test result that is returned by the home gateway device after the home gateway device performs the network test according to the verification configuration information.

For this step, this embodiment of the present disclosure sets no specific limitation to a manner in which the terminal receives the network test result that is returned by the home gateway device after the home gateway device performs the network test according to the verification configuration information.

Preferably, in order for the user corresponding to the terminal to determine whether the Internet can be accessed normally, after the terminal receives the network test result returned by the home gateway device, the method further includes displaying the network test result. For a manner in which the terminal displays the network test result, this embodiment of the present disclosure sets no specific limitation thereto.

According to the method provided by this embodiment of the present disclosure, after successfully establishing a wireless connection with a home gateway device in a local area network, a terminal sends a diagnosis request to the home gateway device such that the home gateway device performs fault diagnosis according to the diagnosis request, and when learning, by means of diagnosis, that the Internet cannot be accessed normally currently, the home gateway device returns a diagnosis result to the terminal, where the fault diagnosis result includes network configuration information, afterward, the terminal forwards the fault diagnosis result to an NMS such that the NMS performs verification on the network configuration information included in the fault diagnosis result, and after obtaining verification configuration information, the NMS sends the verification configuration information to the terminal, and the terminal forwards the verification configuration information to the home gateway device. This ensures that when a user cannot access the Internet normally because a fault occurs in the home gateway device due to network configuration information, the fault can be cleared in a manner in which the terminal interacts with the home gateway device and the NMS to obtain verification configuration information, which not only can clear the fault in a timely manner and therefore improve efficiency of diagnosis for the home gateway device, but also saves manpower resources for operating and maintaining the home gateway device and reduces costs of using the home gateway device for the user.

Embodiment 5

Figure 6:
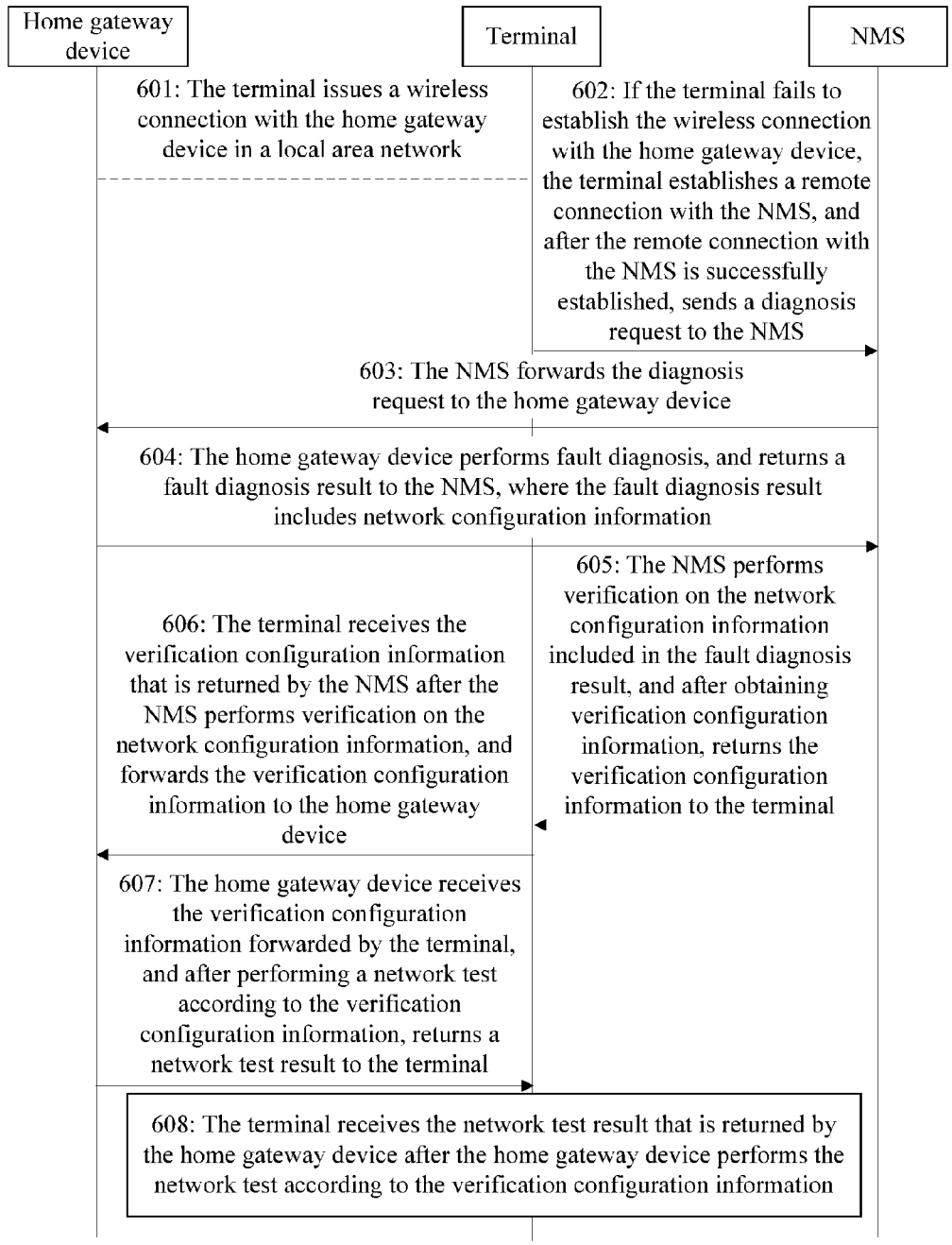
FIG. 6 is a flowchart of a fault diagnosis method according to Embodiment 5 of the present disclosure.

With reference to the content of the foregoing Embodiment 1, this embodiment of the present disclosure provides a fault diagnosis method. Referring to FIG. 6, a workflow of the method provided by this embodiment of the present disclosure includes the following steps.

Step 601: A terminal issues a wireless connection with a home gateway device in a local area network.

A principle of this step is the same as a principle of step 301 in Embodiment 2. For specifics, refer to specific content of step 301 in the foregoing Embodiment 2, and details are not described herein again.

Step 602: If the terminal fails to establish the wireless connection with the home gateway device, the terminal establishes a remote connection with an NMS, and after the remote connection with the NMS is successfully established, sends a diagnosis request to the NMS.

A principle of this step is the same as a principle of step 402 in Embodiment 3. For specifics, refer to specific content of step 402 in the foregoing Embodiment 3, and details are not described herein again.

Step 603: The NMS forwards the diagnosis request to the home gateway device.

A principle of this step is the same as a principle of step 403 in Embodiment 3. For specifics, refer to specific content of step 403 in the foregoing Embodiment 3, and details are not described herein again.

Step 604: The home gateway device performs fault diagnosis, and returns a fault diagnosis result to the NMS, where the fault diagnosis result includes network configuration information.

A principle of this step is the same as a principle of step 404 in Embodiment 3. For specifics, refer to specific content of step 404 in the foregoing Embodiment 3, and details are not described herein again.

Step 605: The NMS performs verification on the network configuration information included in the fault diagnosis result, and after obtaining verification configuration information, returns the verification configuration information to the terminal.

A principle of this step is the same as a principle of step 506 in Embodiment 4. For specifics, refer to specific content of step 506 in the foregoing Embodiment 4, and details are not described herein again.

Step 606: The terminal receives the verification configuration information that is returned by the NMS after the NMS performs verification on the network configuration information, and forwards the verification configuration information to the home gateway device.

A principle of this step is the same as a principle of step 507 in Embodiment 4. For specifics, refer to specific content of step 507 in the foregoing Embodiment 4, and details are not described herein again.

Step 607: The home gateway device receives the verification configuration information forwarded by the terminal, and after performing a network test according to the verification configuration information, returns a network test result to the terminal.

A principle of this step is the same as a principle of step 508 in Embodiment 4. For specifics, refer to specific content of step 508 in the foregoing Embodiment 4, and details are not described herein again.

Step 608: The terminal receives the network test result that is returned by the home gateway device after the home gateway device performs the network test according to the verification configuration information.

A principle of this step is the same as a principle of step 509 in Embodiment 4. For specifics, refer to specific content of step 509 in the foregoing Embodiment 4, and details are not described herein again.

According to the method provided by this embodiment of the present disclosure, when a terminal fails to establish a wireless connection with a home gateway device in a local area network, the terminal may send a diagnosis request to an NMS, after the NMS forwards the diagnosis request to the home gateway device, the home gateway device is triggered to diagnose a fault, and when learning, by means of diagnosis, that the Internet cannot be accessed normally currently, the home gateway device returns a fault diagnosis result to the NMS, where the fault diagnosis result includes network configuration information, and after performing verification on the network configuration information included in the fault diagnosis result, the NMS returns verification configuration information to the terminal. In this way, even if the terminal cannot establish a wireless connection with the home gateway device, a user of the terminal can still clear, in a timely manner, the fault of the home gateway device without depending on manpower resources, which not only saves manpower resources for operating and maintaining the home gateway device and reduces costs of using the home gateway device for the user, but also improves efficiency of diagnosis for the home gateway device.

Embodiment 6

Figure 7:
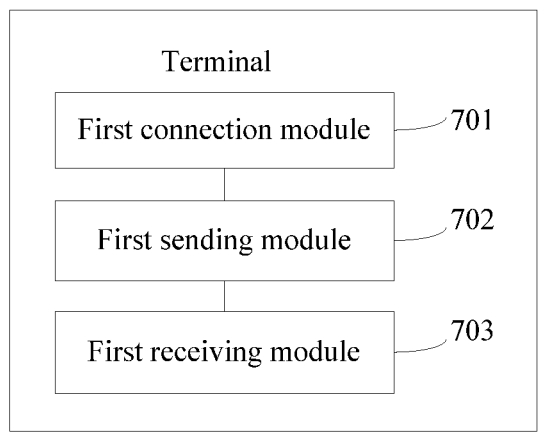
FIG. 7 is a schematic diagram of a structure of a terminal according to Embodiment 6 of the present disclosure.

This embodiment of the present disclosure provides a terminal, where the terminal is used to perform a function performed by the terminal in the foregoing Embodiment 1 to Embodiment 5. Referring to FIG. 7, the terminal includes a first connection module 701 configured to issue a wireless connection with a home gateway device in a local area network, a first sending module 702 configured to, if the wireless connection with the home gateway device is successfully established, send a diagnosis request to the home gateway device such that the home gateway device performs fault diagnosis according to the diagnosis request, and a first receiving module 703 configured to receive a fault diagnosis result returned by the home gateway device.

Preferably, the terminal further includes a second connection module configured to, when the wireless connection with the home gateway device is not successfully established, issue a remote connection with a NMS, a second sending module configured to, after the remote connection with the NMS is successfully established, send a diagnosis request to the NMS such that the NMS forwards the diagnosis request to the home gateway device for the home gateway device to perform fault diagnosis, and receives a fault diagnosis result sent by the home gateway device, and a second receiving module configured to receive the fault diagnosis result forwarded by the NMS.

Preferably, the terminal further includes a third connection module configured to issue a remote connection with a NMS, and a first forwarding module configured to, after the remote connection with the NMS is successfully established, forward the fault diagnosis result to the NMS.

Preferably, the fault diagnosis result includes network configuration information, and the terminal further includes a third receiving module configured to receive verification configuration information that is returned by the NMS after the NMS performs verification on the network configuration information, a second forwarding module configured to forward the verification configuration information to the home gateway device, and a fourth receiving module configured to receive a network test result that is returned by the home gateway device after the home gateway device performs a network test according to the verification configuration information.

After successfully establishing a wireless connection with a home gateway device in a local area network, the terminal provided by this embodiment of the present disclosure sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, the diagnosis result is forwarded to the NMS subsequently, ensuring that an operator of the home gateway device can perform collection and analysis on the fault of the home gateway device, and therefore can implement optimization and improvement of the home gateway device subsequently.

Further, when the terminal fails to establish the wireless connection with the home gateway device in the local area network, the terminal can send a diagnosis request to the NMS, after the NMS forwards the diagnosis request to the home gateway device, the home gateway device is triggered to diagnose the fault, and after obtaining a fault diagnosis result, returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 7

Figure 8:
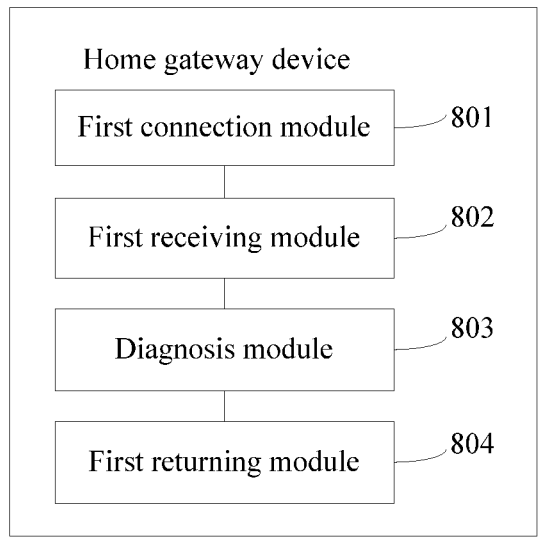
FIG. 8 is a schematic diagram of a structure of a home gateway device according to Embodiment 7 of the present disclosure.

This embodiment of the present disclosure provides a home gateway device, where the home gateway device is used to perform a function performed by the home gateway device in the foregoing Embodiment 1 to Embodiment 5. Referring to FIG. 8, the home gateway device includes a first connection module 801 configured to issue a wireless connection with a terminal in a local area network, a first receiving module 802 configured to, after the wireless connection with the terminal is successfully established, receive a diagnosis request sent by the terminal, a diagnosis module 803 configured to perform fault diagnosis according to the diagnosis request sent by the terminal, and a first returning module 804 configured to return a fault diagnosis result to the terminal.

Preferably, the device further includes a second receiving module configured to, when the wireless connection with the terminal is not successfully established, receive a diagnosis request forwarded by an NMS, where the diagnosis request is sent to the NMS by the terminal, and the diagnosis module is further configured to perform fault diagnosis according to the diagnosis request forwarded by the NMS, and a first sending module configured to send a fault diagnosis result to the NMS, where the NMS forwards the fault diagnosis result to the terminal.

Preferably, the fault diagnosis result includes network configuration information, and the device further includes a third receiving module configured to receive verification configuration information forwarded by the terminal, and a second returning module configured to, after performing a network test according to the verification configuration information, return a network test result to the terminal, where the verification configuration information is returned to the terminal by the NMS after the NMS performs verification on the network configuration information.

Preferably, the device further includes an authentication module configured to perform authentication on the device that sends the diagnosis request, where the diagnosis module is further configured to, after the authentication succeeds, perform the step of performing fault diagnosis according to the diagnosis request.

After successfully establishing a wireless connection with a home gateway device in a local area network, the home gateway device provided by this embodiment of the present disclosure receives a diagnosis request sent by a terminal, and after performing fault diagnosis according to the diagnosis request and obtaining a fault diagnosis result, returns the fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, when the terminal fails to establish the wireless connection with the home gateway device in the local area network, the home gateway device receives a diagnosis request from the terminal that is forwarded by the NMS, and the home gateway device is triggered to diagnose the fault, and after obtaining a fault diagnosis result, the home gateway device returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 8

Figure 9:
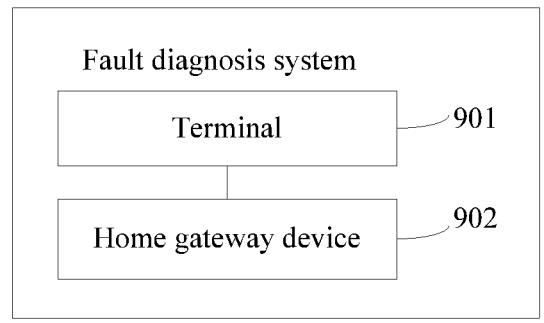
FIG. 9 is a schematic diagram of a structure of a fault diagnosis system according to Embodiment 8 of the present disclosure.

Referring to FIG. 9, this embodiment of the present disclosure provides a fault diagnosis system, where the system includes a terminal 901 and a home gateway device 902, where the terminal 901 is as the terminal provided by the foregoing Embodiment 6, and for specifics, refer to the content of the foregoing Embodiment 6, and details are not described herein again, and the home gateway device 902 is as the home gateway device provided by the foregoing Embodiment 7, and for specifics, refer to the content of the foregoing Embodiment 7, and details are not described herein again.

According to the system provided by this embodiment of the present disclosure, after successfully establishing a wireless connection with a home gateway device in a local area network, a terminal sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, the diagnosis result is forwarded to the NMS subsequently, ensuring that an operator of the home gateway device can perform collection and analysis on the fault of the home gateway device, and therefore can implement optimization and improvement of the home gateway device subsequently.

Further, when the terminal fails to establish the wireless connection with the home gateway device in the local area network, the terminal can send a diagnosis request to the NMS, after the NMS forwards the diagnosis request to the home gateway device, the home gateway device is triggered to diagnose the fault, and after obtaining a fault diagnosis result, returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 9

Figure 10:
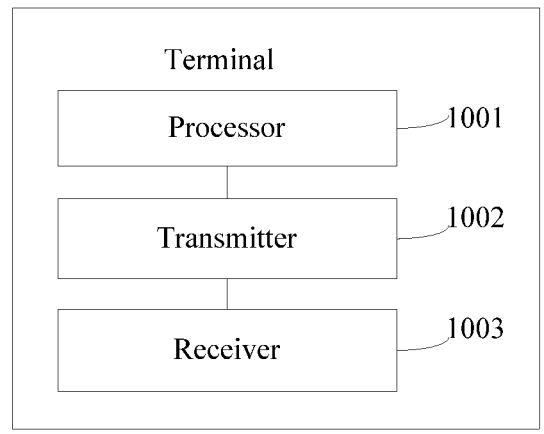
FIG. 10 is a schematic diagram of a structure of a terminal according to Embodiment 9 of the present disclosure.

FIG. 10 is a schematic diagram of a structure of a terminal in an implementation manner. The terminal includes at least one processor 1001, a transmitter 1002, and a receiver 1003, where the processor 1001 is configured to issue a wireless connection with a home gateway device in a local area network, the transmitter 1002 is configured to if the wireless connection with the home gateway device is successfully established, send a diagnosis request to the home gateway device such that the home gateway device performs fault diagnosis according to the diagnosis request, and the receiver 1003 is configured to receive a fault diagnosis result returned by the home gateway device.

Preferably, the processor 1001 is further configured to, when the wireless connection with the home gateway device is not successfully established, issue a remote connection with a NMS, the transmitter 1002 is further configured to, after the remote connection with the NMS is successfully established, send a diagnosis request to the NMS such that the NMS forwards the diagnosis request to the home gateway device for the home gateway device to perform fault diagnosis, and receives a fault diagnosis result sent by the home gateway device, and the receiver 1003 is further configured to receive the fault diagnosis result forwarded by the NMS.

Preferably, the processor 1001 is further configured to issue a remote connection with a NMS, and the transmitter 1002 is further configured to, after the remote connection with the NMS is successfully established, forward the fault diagnosis result to the NMS.

Preferably, the fault diagnosis result includes network configuration information, and the receiver 1003 is further configured to receive verification configuration information that is returned by the NMS after the NMS performs verification on the network configuration information, the transmitter 1002 is further configured to forward the verification configuration information to the home gateway device, and the receiver 1003 is further configured to receive a network test result that is returned by the home gateway device after the home gateway device performs a network test according to the verification configuration information.

After successfully establishing a wireless connection with a home gateway device in a local area network, the terminal provided by this embodiment of the present disclosure sends a diagnosis request to the home gateway device such that the home gateway device performs fault diagnosis according to the diagnosis request and returns a fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, the diagnosis result is forwarded to the NMS subsequently, ensuring that an operator of the home gateway device can perform collection and analysis on the fault of the home gateway device, and therefore can implement optimization and improvement of the home gateway device subsequently.

Further, when the terminal fails to establish the wireless connection with the home gateway device in the local area network, the terminal can send a diagnosis request to the NMS, after the NMS forwards the diagnosis request to the home gateway device, the home gateway device is triggered to diagnose the fault, and after obtaining a fault diagnosis result, returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

Embodiment 10

Figure 11:
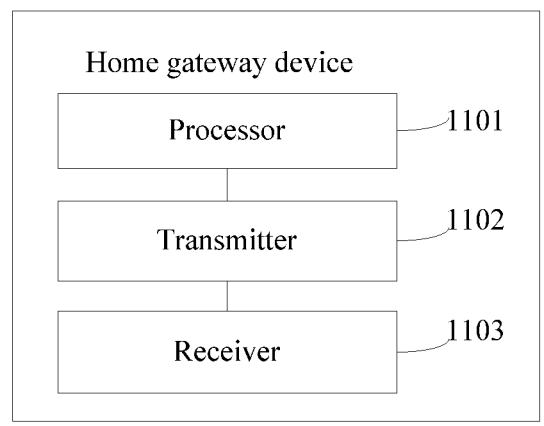
FIG. 11 is a schematic diagram of a structure of a home gateway device according to Embodiment 10 of the present disclosure.

FIG. 11 is a schematic diagram of a structure of a home gateway device in an implementation manner. The home gateway device includes at least one processor 1101, a transmitter 1102, and a receiver 1103, where the processor 1101 is configured to issue a wireless connection with a terminal in a local area network, the receiver 1103 is configured to, after the wireless connection with the terminal is successfully established, receive a diagnosis request sent by the terminal, the processor 1101 is further configured to perform fault diagnosis according to the diagnosis request sent by the terminal, and the transmitter 1102 is further configured to return a fault diagnosis result to the terminal.

Preferably, the receiver 1103 is further configured to, when the wireless connection with the terminal is not successfully established, receive a diagnosis request forwarded by an NMS, where the diagnosis request is sent to the NMS by the terminal, the processor 1101 is further configured to perform fault diagnosis according to the diagnosis request sent by the NMS, and the transmitter 1102 is further configured to send a fault diagnosis result to the NMS, where the NMS forwards the fault diagnosis result to the terminal.

Preferably, the fault diagnosis result includes network configuration information, and the receiver 1103 is further configured to receive verification configuration information forwarded by the terminal, and the transmitter 1102 is further configured to, after performing a network test according to the verification configuration information, return a network test result to the terminal, where the verification configuration information is returned to the terminal by the NMS after the NMS performs verification on the network configuration information.

Preferably, the processor 1101 is further configured to perform authentication on the device that sends the diagnosis request, and after the authentication succeeds, perform the step of performing fault diagnosis according to the diagnosis request.

After successfully establishing a wireless connection with a home gateway device in a local area network, the home gateway device provided by this embodiment of the present disclosure receives a diagnosis request sent by a terminal, and after performing fault diagnosis according to the diagnosis request and obtaining a fault diagnosis result, returns the fault diagnosis result to the terminal. This ensures that when a fault occurs in the home gateway device, a user can obtain, in a timely manner, a fault condition of the home gateway device using the terminal that is located in the same local area network as the home gateway device without depending on an NMS, which not only can rectify the fault in a timely manner and therefore improve diagnosis efficiency for the home gateway device, but also saves manpower resources for operating and maintaining the home gateway device and reduces costs of using the home gateway device for the user.

In addition, when the terminal fails to establish the wireless connection with the home gateway device in the local area network, the home gateway device receives a diagnosis request from the terminal that is forwarded by the NMS, and the home gateway device is triggered to diagnose the fault, and after obtaining a fault diagnosis result, the home gateway device returns the fault diagnosis result to the NMS, and the NMS returns the fault diagnosis result to the terminal. In this way, even if the terminal cannot establish a wireless connection with the home gateway device, the user of the terminal can still obtain the fault condition of the home gateway device without depending on manpower resources, which not only saves manpower resources for operating and maintaining the home gateway device and reduces costs of using the home gateway device for the user, but also improves efficiency of diagnosis for the home gateway device.

It should be noted that, when the terminal and the home gateway device provided by the foregoing embodiments trigger the fault diagnosis method, the division of the foregoing function modules is merely used as an example for description. In an actual application, the foregoing functions may be allocated, according to a need, to different function modules and performed by the function modules, that is, internal structures of the terminal and the home gateway device are divided into different function modules to perform all or a part of functions described above. In addition, the embodiments of the terminal, the home gateway device, the fault diagnosis system, and the fault diagnosis method provided by the foregoing embodiments belong to a same conception. For specific implementation processes thereof, refer to the method embodiments, and details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely exemplary embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A terminal comprising:
   a transmitter;
   a receiver; and
   a processor coupled to the transmitter and the receiver, the processor being configured to:
   issue a wireless connection with a home gateway device in a local area network;
   send a diagnosis request to the home gateway device when the wireless connection with the home gateway device is successfully established such that the home gateway device, in response to receiving the diagnosis request from the terminal, performs authentication on the terminal that sends the diagnosis request and performs fault diagnosis on the home gateway device so as to determine a fault condition or a fault parameter in the home gateway device;
   issue a remote connection with a network management system (NMS) when the wireless connection with the home gateway device is not successfully established by the terminal;
   send the diagnosis request to the NMS after the remote connection with the NMS is successfully established such that the NMS forwards the diagnosis request to the home gateway device so that the home gateway device performs the fault diagnosis, and the NMS receives a fault diagnosis result from the home gateway device responsive to the fault diagnosis; and
   receive the fault diagnosis result from the home gateway device or from the NMS.

2. A fault diagnosis method, comprising:
   issuing, by a terminal, a wireless connection with a home gateway device in a local area network;
   sending, by the terminal, a diagnosis request to the home gateway device when the wireless connection with the home gateway device is successfully established such that the home gateway device, in response to receiving the diagnosis request from the terminal, performs authentication on the terminal that sends the diagnosis request and performs fault diagnosis on the home gateway device so as to determine a fault condition or a fault parameter in the home gateway device;
   issuing, by the terminal, when the wireless connection with the home gateway device is not successfully established, a remote connection with a network management system (NMS);
   sending, by the terminal after the remote connection with the NMS is successfully established, the diagnosis request to the NMS such that the NMS forwards the diagnosis request to the home gateway device for the home gateway device to perform the fault diagnosis, and the NMS receives a fault diagnosis result from the home gateway device responsive to the fault diagnosis; and
   receiving, by the terminal, the fault diagnosis result returned by the home gateway device or from the NMS.

3. The method according to claim 2, wherein the fault diagnosis result comprises network configuration information, and the method further comprising:
   receiving, by the terminal, verification configuration information that is returned by the NMS after the NMS performs verification on the network configuration information;
   forwarding, by the terminal, the verification configuration information to the home gateway device; and
   receiving, by the terminal, a network test result that is returned by the home gateway device after the home gateway device performs a network test according to the verification configuration information.

4. The method according to claim 2, wherein after receiving the fault diagnosis result returned by the home gateway device, the method further comprises:
   issuing, by the terminal, a remote connection with the NMS; and
   forwarding, by the terminal after the remote connection with the NMS is successfully established, the fault diagnosis result to the NMS.

5. The method according to claim 4, wherein the fault diagnosis result comprises network configuration information, and the method further comprising:
   receiving, by the terminal, verification configuration information that is returned by the NMS after the NMS performs verification on the network configuration information;
   forwarding, by the terminal, the verification configuration information to the home gateway device; and
   receiving, by the terminal, a network test result returned by the home gateway device after the home gateway device performs a network test according to the verification configuration information.

6. A home gateway device, comprising:
a memory comprising instructions;
a transmitter;
a receiver;
an interface; and
a processor coupled to the memory, the transmitter, the receiver, and the interface through a data bus, the instructions causing the processor to be configured to:
issue a wireless connection with a terminal in a local area network;
receive a diagnosis request from the terminal after the wireless connection with the terminal is successfully established;
perform authentication on the terminal that sends the diagnosis request;
perform fault diagnosis according to the diagnosis request after the authentication succeeds; and
return a fault diagnosis result to the terminal.

7. The home gateway device according to claim 6, wherein the instructions further cause the processor to be configured to:
receive verification configuration information forwarded by the terminal, the verification configuration information being returned to the terminal by a network management system (NMS) after the NMS performs verification on network configuration information;
perform a network test according to the verification configuration information; and
return a network test result to the terminal after performing the network test.

8. The home gateway device according to claim 6, wherein the instructions further cause the processor to be configured to:
receive a diagnosis request forwarded by a network management system (NMS) when the wireless connection with the terminal is not successfully established, the diagnosis request being received at the NMS from the terminal;
perform fault diagnosis according to the diagnosis request forwarded by the NMS; and
send a fault diagnosis result to the NMS such that the NMS forwards the fault diagnosis result to the terminal.

9. The home gateway device according to claim 8, wherein the instructions further cause the processor to be configured to:
receive verification configuration information forwarded by the terminal, the verification configuration information being returned to the terminal by the NMS after the NMS performs verification on network configuration information;
perform a network test according to the verification configuration information; and
return a network test result to the terminal after performing the network test.

10. The home gateway device according to claim 8, wherein the instructions further cause the processor to be configured to:
perform authentication on the terminal that sends the diagnosis request; and
perform fault diagnosis according to the diagnosis request after the authentication succeeds.

11. A terminal comprising:
a transmitter;
a receiver; and
a processor coupled to the transmitter and the receiver, the processor being configured to:
issue a wireless connection with a home gateway device in a local area network;
issue a remote connection with a network management system (NMS) when the wireless connection with the home gateway device is not successfully established by the terminal;
send a diagnosis request to the NMS after the remote connection with the NMS is successfully established such that the NMS forwards the diagnosis request to the home gateway device for the home gateway device to perform fault diagnosis, and the NMS receives a fault diagnosis result from the home gateway device responsive to the fault diagnosis; and
receive the fault diagnosis result forwarded by the NMS.

12. A fault diagnosis method, comprising:
issuing, by a terminal, a wireless connection with a home gateway device in a local area network;
issuing, by the terminal, a remote connection with a network management system (NMS) when the wireless connection with the home gateway device is not successfully established;
sending, by the terminal after the remote connection with the NMS is successfully established, a diagnosis request to the NMS such that the NMS forwards the diagnosis request to the home gateway device for the home gateway device to perform fault diagnosis, and the NMS receives a fault diagnosis result from the home gateway device responsive to the fault diagnosis; and
receiving, by the terminal, the fault diagnosis result forwarded by the NMS.

* * * * *